US006785461B2

(12) United States Patent
Chan (10) Patent No.: US 6,785,461 B2
(45) Date of Patent: Aug. 31, 2004

(54) BLOCKLESS FIBER OPTIC ATTENUATORS AND ATTENUATION SYSTEMS EMPLOYING DISPERSION TAILORED POLYMERS

(75) Inventor: Kwok P. Chan, Troy, NY (US)

(73) Assignee: Molecular OptoElectronics Corp., Watervliet, NY (US)

(*) Notice: Subject to any disclaimer, the term of this patent is extended or adjusted under 35 U.S.C. 154(b) by 361 days.

(21) Appl. No.: 10/037,496

(22) Filed: Jan. 2, 2002

(65) Prior Publication Data

US 2002/0168170 A1 Nov. 14, 2002

Related U.S. Application Data

(63) Continuation-in-part of application No. 09/789,093, filed on Feb. 20, 2001, now Pat. No. 6,335,998, which is a continuation of application No. 09/139,787, filed on Aug. 25, 1998, now Pat. No. 6,205,280, and a continuation-in-part of application No. 09/139,832, filed on Aug. 25, 1998, now Pat. No. 6,374,011.

(51) Int. Cl.$^7$ ................................................ G02B 6/00
(52) U.S. Cl. ........................ 385/140; 385/12; 385/39; 385/40; 385/123
(58) Field of Search ................................ 385/12, 13, 30, 385/31, 32, 39, 40, 41, 123, 129, 140

(56) References Cited

U.S. PATENT DOCUMENTS

| 4,060,308 A | 11/1977 | Barnoski et al. ........... 385/43 X |
|---|---|---|
| 4,201,446 A | 5/1980 | Geddes et al. ........... 385/123 X |
| 4,343,532 A | 8/1982 | Palmer ...................... 385/37 X |
| 4,387,954 A | 6/1983 | Beasley ......................... 385/42 |
| 4,469,544 A | 9/1984 | Goodman ................... 156/345 |
| 4,469,554 A | 9/1984 | Turner ......................... 156/657 |
| 4,630,884 A | 12/1986 | Jubinski ....................... 385/42 |
| 4,630,890 A | 12/1986 | Ashkin et al. ........... 385/123 X |

(List continued on next page.)

FOREIGN PATENT DOCUMENTS

| DE | 4005557 A1 | 8/1991 | ................. 385/1 X |
|---|---|---|---|
| DE | 4343943 A1 | 6/1995 | ............. 385/140 X |
| EP | 0229456 A2 | 7/1987 | ............... 385/42 X |
| EP | 0488266 A2 | 6/1992 | ............... 385/42 X |
| EP | 0686 867 A1 | 12/1995 | ............... 385/11 X |
| EP | 1035680 A2 | 9/2000 | ............... 385/17 X |
| EP | 1037090 A2 | 9/2000 | ............... 385/17 X |
| EP | 1065821 A2 | 1/2001 | ............... 385/24 X |
| GB | 2190211 A | 11/1987 | ............. 385/140 X |
| GB | 2184859 A | 7/1997 | ............. 385/140 X |
| GB | 2351625 A | 1/2001 | ............. 385/140 X |
| JP | 60-203904 | 10/1985 | ............. 385/147 X |
| JP | 06-114713 | 4/1994 | ............. 385/147 X |

(List continued on next page.)

OTHER PUBLICATIONS

Bergh, R. A. et al., "Single–Mode Fibre Optic Directional Coupler," *Electron. Lett.* 16(7), 260–261 (Mar. 1980).
Birks, T.A. and Li, Y.W., "The Shape of Fiber Tapers," *IEEE J. Lightwave Techn.* 10(4), 432–438 (Apr. 1992).
Brophy, T.J. et al., "Formation and Measurement of Tapers in Optical Fibers," *Rev. Sci. Instrum.* 64 (9), 2650–2654 (Sep. 1993).

(List continued on next page.)

*Primary Examiner*—Brian M. Healy
(74) *Attorney, Agent, or Firm*—Heslin Rothenberg Farley & Mesiti P.C.; Martha L. Boden, Esq.

(57) ABSTRACT

Controllable fiber optic attenuators and attenuation systems are disclosed for controllably extracting optical energy from a fiber optic, and therefore attenuating the optical signal being transmitted through the fiber optic. Material removed from a portion of the fiber optic exposes a side surface through which optical energy can be extracted. The portion of the fiber is suspended between two support points, and a controllable material is formed over the surface for controllably extracting optical energy according to a changeable stimulus applied thereto, which affects the refractive index thereof. In one embodiment, the changeable stimulus is light energy from a light source having a different wavelength from the wavelength of the optical energy of interest.

1 Claim, 8 Drawing Sheets

U.S. PATENT DOCUMENTS

| | | | |
|---|---|---|---|
| 4,704,151 A | 11/1987 | Keck | 65/4.1 |
| 4,712,866 A | 12/1987 | Dyott | 385/123 X |
| 4,753,497 A | 6/1988 | Fujii et al. | 385/42 X |
| 4,773,924 A | 9/1988 | Berkey | 65/3.11 |
| 4,778,237 A | 10/1988 | Sorin et al. | 385/42 X |
| 4,786,130 A | 11/1988 | Georgiou et al. | 385/42 X |
| 5,060,307 A | 10/1991 | El-Sherif | 359/173 |
| 5,067,788 A | 11/1991 | Jannson et al. | 385/2 |
| 5,078,465 A | 1/1992 | Dahlgren | 385/50 |
| 5,091,984 A | 2/1992 | Kobayashi et al. | 385/16 |
| 5,106,394 A | 4/1992 | Bramson | 51/309 |
| 5,108,200 A | 4/1992 | Nonaka et al. | 385/16 |
| 5,135,555 A | 8/1992 | Coyle, Jr. et al. | 65/12 |
| 5,136,818 A | 8/1992 | Bramson | 51/165.72 |
| 5,265,178 A | 11/1993 | Braun et al. | 385/24 |
| 5,290,398 A | 3/1994 | Feldman et al. | 156/651 |
| 5,351,319 A | 9/1994 | Ginder et al. | 385/6 |
| 5,444,723 A | 8/1995 | Chandonnet et al. | 372/14 |
| 5,493,629 A | 2/1996 | Stange | 385/125 |
| 5,623,567 A | 4/1997 | Barberio et al. | 385/30 |
| 5,673,351 A | 9/1997 | Clarke et al. | 385/100 |
| 5,781,675 A | 7/1998 | Tseng et al. | 385/30 |
| 5,853,969 A | 12/1998 | Harada et al. | 430/510 |
| 5,966,493 A | 10/1999 | Wagoner et al. | 385/140 |
| 6,011,881 A | 1/2000 | Moslehi et al. | 385/10 |
| 6,095,905 A | 8/2000 | Jameson | 451/41 |
| 6,191,224 B1 * | 2/2001 | Chan et al. | 525/195 |
| 6,205,280 B1 | 3/2001 | Wagoner et al. | 385/140 |
| 6,238,274 B1 | 5/2001 | Jameson | 451/41 |
| 6,268,435 B1 * | 7/2001 | Chan et al. | 525/195 |
| 6,301,426 B1 | 10/2001 | Jameson et al. | 385/140 |
| 6,303,695 B1 * | 10/2001 | Chan et al. | 525/195 |
| 6,335,998 B2 | 1/2002 | Wagoner et al. | 385/140 |
| 6,483,981 B1 * | 11/2002 | Krahn et al. | 385/140 |

FOREIGN PATENT DOCUMENTS

| | | | | |
|---|---|---|---|---|
| WO | WO 87/03676 | 6/1987 | | 385/140 X |
| WO | WO 89/01171 | 2/1989 | | 385/140 X |
| WO | WO 95/05617 | 2/1995 | | 385/140 X |
| WO | WO 00/49434 | 8/2000 | | 385/140 X |
| WO | WO 00/49438 | 8/2000 | | 385/11 X |
| WO | WO 00/49439 | 8/2000 | | 385/147 X |

OTHER PUBLICATIONS

Carrara, S. L. A. et al., "Elasto–Optic Alignment of Birefringent Axes in Polarization–Holding Optical Fiber," *Opt. Lett.* 11 (7), 470–472 (Jul. 1986).

Cordaro, M. H. et al., "Precision Fabrication of D–Shaped Single–Mode Optical Fibers by In Situ Monitoring," *IEEE J. Lightwave Techn.*, 12, (9) 1524–1531 (Sep. 1994).

Diez A. et al., "Cynlindrical Metal–Coated Optical Fibre Devices for Filters and Sensors," *Electron. Lett.* 32 (15), 1390–1392 (Jul. 1996).

Digonnet, M. J. F., et al., "Measurement of the Core Proximity in Polished Substrates and Couplers," *Opt. Lett.* 10 (9), 463–465 (Sep. 1985).

Fink, Donald G. and Christiansen, Donald, *Electronic Engineers' Handbook*, Third Edition, Ch. 24, 14–18 (1989).

Gowar, J., *Optical Communication Systems*, Ch.3, 58–77 (2d Ed. 1993).

Hussey, C.D. and Minelly, J.D., "Optical Fibre Polishing with a Motor–Driven Polishing Wheel," *Electron. Lett.* 24, 805–807 (Jun. 1988).

Kenny, R.P. et al., "Control of Optical Fibre Taper Shape," *Electron. Lett.* 27 (18), 1654–1656 (Aug. 1991).

Love, J.D. and Henry, W.M. "Quantifying Loss Minimisation in Single–Mode Fibre Tapers," *Electron. Lett.* 22 (17), 912–914 (Aug. 1986).

McCallion, K. J. and Shimazu, M., "Side–Polished Fiber Provides Functionality and Transparency," *Optoelectronics World*, S19, S20, S22 and S24 (Sep. 1998).

Morozov V. et al., "Fused Fiber Optic Variable Attenuator," *OFC 2000, $25^{th}$ Annual Optical Fiber Commincations Conference*, 22–24 (Mar. 10, 2000).

Mueller–Westerhoff, U.T. et al., "The Synthesis of Dithiolene Dyes with Strong Near–IR Absorption," *Tetrahedron* 47, 909–932 (1991).

Leminger, O.G. and R. Zengerle, "Determination of Single–Mode Fiber Coupler Design Parameters from Loss Measurements," *IEEE J. Lightwave Techn..*, LT–3 (4), 864–867 (Aug. 1985).

Pan, Ru–Pin et al., "Voltage–Controlled Optical Fiber Coupler Using a Layer of a Low–Refractive–Index Liquid Crystal with Positive Dielectric Anisotrophy," *Jpn. J. Appl. Phys.* 34, Part 1, No. 12A, 6410–6415 (Dec. 1995).

Parriaux, O. et al., "Distributed Coupling on Polished Single–Mode Optical Fibers," *Appl. Opt.* 20, 2420–2423 (Jul. 1981).

Todd, D.A. et al., "Polarization–Splitting Polished Fibre Optic Couplers," *Optical Engineering* 32 (9), 2077–2082 (Sep. 1993).

Marlow Industries, Inc., "Design Guide—Power Supplies" and "Frequently Asked Questions" www.marlow.com.

Technological Arts, Adapt912 Technical Specification Sheet (1999).

Chan et al., "Dye–Appended Dispersion–Controlled Polymers for Broadband Fiber Optic Devices," pending U.S. patent application Ser. No. 09/628,887 filed Jul. 31, 2000.

Gordon et al., "Single Channel Attenuators," pending U.S. patent application Ser. No. 09/605,110, filed Jun. 28, 2000.

Wagoner et al., "Controllable Fiber Optic Attenuators Employing Tapered and/or Etched Fiber Sections," pending U.S. application Ser. No. 09/539,469, filed Mar. 30, 2000.

* cited by examiner

BLOCKLESS FIBER OPTIC ATTENUATORS AND ATTENUATION SYSTEMS EMPLOYING DISPERSION TAILORED POLYMERS

CROSS-REFERENCE TO RELATED APPLICATIONS

This application is a Continuation-In-Part of U.S. application Ser. No. 09/789,093 filed Feb 20, 2001, now issued as U.S. Pat. No. 6,335,998, entitled "BLOCKLESS FIBER OPTIC ATTENUATORS AND ATTENUATION SYSTEMS EMPLOYING DISPERSION TAILORED POLYMERS", which is a Continuation of Ser. No. 09/139,787 filed Aug. 25, 1998, now issued as U.S. Pat. No. 6,205,280, entitled "BLOCKLESS FIBER OPTIC ATTENUATORS AND ATTENUATION SYSTEMS EMPLOYING DISPERSION CONTROLLED POLYMERS", and is also a Continuation-In-Part of U.S. application Ser. No. 09/139,832, filed Aug. 25, 1998, now U.S. Pat. No. 6,374,011, entitled "BLOCKLESS TECHNIQUES FOR SIMULTANEOUS POLISHING OF MULTIPLE FIBER OPTICS", and is related to U.S. Pat. No. 5,966,493 entitled "FIBER OPTIC ATTENUATORS AND ATTENUATION SYSTEMS;" and to U.S. Pat. Nos. 6,191,224; 6,268,435; and 6,303,695, entitled "DISPERSION CONTROLLED POLYMERS FOR BROADBAND FIBER OPTIC DEVICES", and also related to U.S. patent application Ser. No. 09/628,887 filed Jul. 30, 2000, entitled "DYE-APPENDED DISPERSION-CONTROLLED POLYMERS FOR BROADBAND FIBER OPTIC DEVICES" and to U.S. patent application Ser. No. 09/605,110 filed Jun. 28, 2000, entitled "SINGLE-CHANNEL ATTENUATORS". Each of these patents and patent applications is hereby incorporated by reference herein in its entirety.

TECHNICAL FIELD

The present invention relates to controllable attenuators and attenuation systems for attenuating optical energy transmitted through a fiber optic.

BACKGROUND OF THE INVENTION

There are requirements in fiber optic systems for precise control of optical signal levels entering various system components. This is particularly true for systems at test and characterization stages of deployment. A controllable optical attenuator can be used, for example, to characterize and optimize the optoelectronic response of high-speed photoreceivers, wherein the detection responsivity is dependent on the average optical power incident on the photodiode.

The majority of controllable fiber optic attenuators currently commercially available rely on thin-film absorption filters, which require breaking the fiber and placing the filters in-line. Controllable attenuation is then achieved by mechanical means such as rotating or sliding the filter to change the optical path length within the absorptive material. This adversely impacts the response speed of the device, the overall mechanical stability, zero attenuation insertion loss and optical back reflection. In general, broken fiber designs suffer numerous disadvantages such as high insertion loss, significant back reflection, and large size. These factors can be minimized, although such corrective measures typically result in added cost and/or size.

Additional issues have impeded the development of thermo-optic variable attenuators, including: (i) the thermal mass of surrounding materials and/or structures which significantly degrades device response time; and (ii) spectrally non-uniform attenuation, resulting from a dispersion mismatch between the optical mode index of the underlying transmission media and a controllable overlay material.

Improved controllable fiber optic attenuators and attenuation systems are therefore required which keep the optical fiber core intact, which achieve controllable attenuation via control of radiative loss from the fiber, and which offer improved response time and spectral uniformity over the wavelength bands of interest.

SUMMARY OF THE INVENTION

The shortcomings of the prior approaches are overcome, and additional advantages are provided, by the present invention, which in one aspect relates to an attenuator for attenuating optical energy transmitted through a portion of a fiber optic. The portion of the fiber optic has side surface through which at least some of the optical energy can be controllably extracted. This portion of the fiber optic may be suspended within a support structure, and a controllable material is formed over the exposed side surface of the fiber optic for controllably extracting the optical energy. The controllable material controllably extracts the energy according to a changeable stimulus, e.g., intensity of light or temperature. The portion of the fiber optic and the controllable material are both positioned to be substantially thermally insulated from any surrounding structures.

The attenuator may also include a controllable heating/cooling source in operative contact with the controllable material to change the temperature thereof, and therefore the attenuating effects thereof. A substantially cylindrical housing may be provided, which includes the support structure, and encloses the portion of the fiber optic, the controllable material and the controllable heating/cooling source. A sensor may also be provided for sensing the temperature of the controllable material, and control leads for both the controllable heating/cooling source and the temperature sensor are provided.

In one aspect, the invention is an attenuator for attenuating optical energy at a first wavelength. The attenuator comprises a portion of a fiber optic through which the optical energy at the first wavelength and through which light energy at a second wavelength are transmitted. The portion of the fiber optic has a side surface through which at least some of the optical energy at the first wavelength can be controllably extracted. In addition, a controllable material is formed over the side surface of the fiber optic, and the controllable material controllably extracts the optical energy at the first wavelength according to a changeable stimulus applied thereto. Also included in the attenuator is a light source in operative contact with the controllable material for applying the changeable stimulus thereto. In this case, the changeable stimulus is the light energy at the second wavelength. The temperature of at least some of the controllable material residing adjacent the side surface of the fiber is raised as the light energy at the second wavelength is absorbed by the controllable material.

To improve spectral uniformity of the response of the attenuator across a given wavelength band (e.g., 1520 nm to 1580 nm), the controllable material may have its optical dispersion properties controlled (e.g., matched) in accordance with those of the fiber in this band. Preferably, the controllable material has its optical dispersion properties substantially matched to those of the fiber in the band of interest. The control of the dispersion properties is effected using, for example, polymers with added or appended dyes, as discussed in detail in the aforementioned U.S. Pat. Nos. 6,191,224; 6,268,435; and 6,303,695, entitled "DISPERSION CONTROLLED POLYMERS FOR BROADBAND FIBER OPTIC DEVICES", and in U.S. patent application Ser. No. 09/628,887 entitled "DYE-APPENDED DISPERSION-CONTROLLED POLYMERS FOR BROADBAND FIBER OPTIC DEVICES", and in U.S. patent application Ser. No. 09/605,110, entitled "SINGLE-CHANNEL ATTENUATORS".

The present invention, in another aspect, relates to methods for attenuating optical energy in a fiber optic using the attenuator discussed above, as well as methods for forming the attenuator discussed above.

The "blockless," dispersion controlled attenuator of the present invention provides a high performance design with wide flexibility. The simplicity of the design permits low-cost, high-volume manufacturing without sacrificing optical performance.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
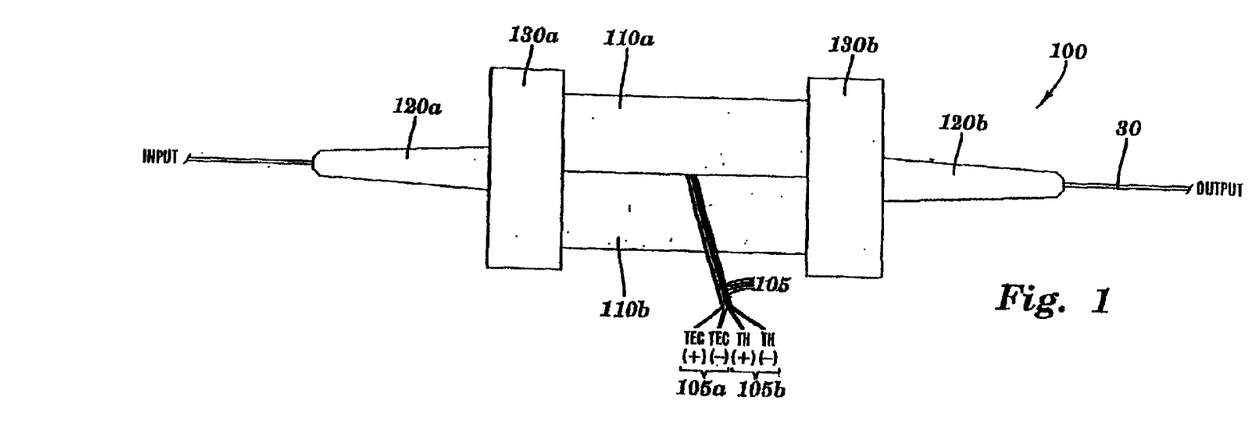
FIG. 1 is a front elevational view of a controllable fiber optic attenuator in accordance with the present invention.

In accordance with the elevational view of FIG. 1, an attenuator 100 is provided in accordance with the present invention for attenuating optical energy transmitted in fiber optic 30. Attenuator 100 includes a housing comprising, for example, strain reliefs 120a and 120b, shell pieces 110a and 110b, and end caps 130a and 130b. Control leads 105a and 105b may also be provided for attenuator control.

As discussed further below, the attenuator is formed with respect to a portion of the fiber optic having material removed therefrom, thereby exposing a side surface thereof, through which optical energy can be controllably extracted. By maintaining the integrity of the fiber optic within this attenuator, unnecessary losses due to interruption of the fiber can be controlled. In one exemplary embodiment, the entire housing, including the strain reliefs, is 2.375 inches in length, and about 0.5 inches in diameter. Therefore, the attenuator of the present invention can be implemented in a relatively small package suitable for many types of system and/or field uses.

Figure 2:
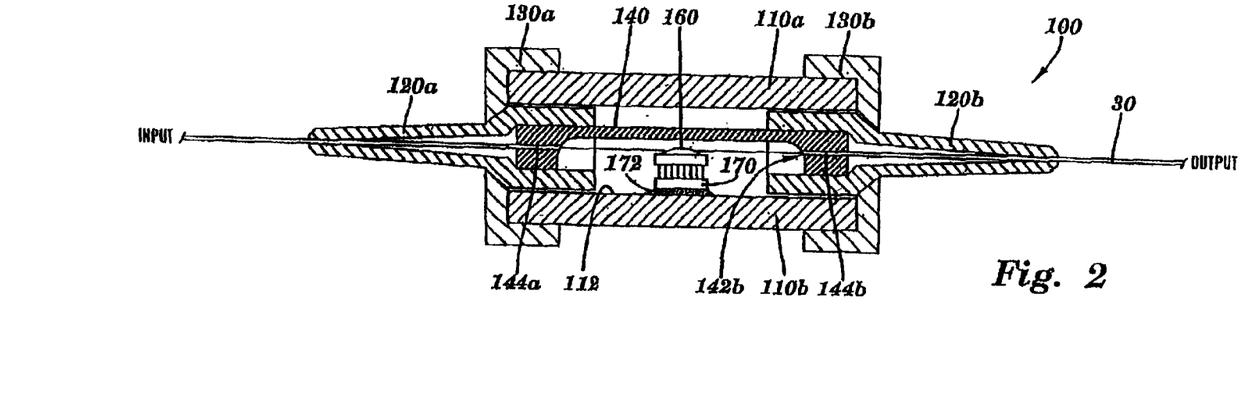
FIG. 2 is a central, cross-sectional view of the attenuator of FIG. 1.

Internal details of attenuator 100 are shown in the central cross-sectional view thereof of FIG. 2. As discussed above, a housing comprising, in one example, strain reliefs 120a and 120b, end caps 130a and 130b, and shell pieces 110a and 110b is provided to accommodate the input and output sections of the fiber, as well as additional, internal components. Another exemplary portion of the housing, i.e., fiber support structure 140, is also shown in FIG. 2 having two support points 142a and 142b between which the fiber is suspended. These support points are at the ends of longitudinal notches 144a and 144b formed in structure 140 to accommodate the input and output portions of the fiber.

In accordance with the previously filed U.S. application Ser. No. 09/026,755 entitled "FIBER OPTIC ATTENUATORS AND ATTENUATION SYSTEMS," a bulk material, here designated 160, can be formed over a side-polished surface of the fiber to controllably remove optical energy therefrom. Either electro-optic or thermo-optic materials are appropriate for this purpose, whose refractive indices, and therefore their attenuation effects, vary with applied electrical, thermal, or optical stimuli, respectively. Shown in FIG. 2 is an exemplary thermo-optic material 160 in contact with the suspended, side-polished portion of fiber optic 30, and with an underlying controllable heating/cooling (heating and/or cooling) source 170 which is mounted, via a thermally conductive epoxy 172, to an inside wall 112 of shell piece 110b.

The suspension of the portion of the fiber 30 and material 160, without any other significant thermal contacts, results in an efficient, thermally insulated attenuation device such that any changes in temperature induced by the controllable heating/cooling source 170 are transferred solely, and quickly, to the thermo-optic material 160, but to no other surrounding structures. This "blockless" technique stands in contrast to the prior technique described in the above-mentioned, previously filed U.S. application, wherein the fiber is mounted in a block, and any thermal changes in the material are also affected by the heat sink characteristics of the block within which the side-polished fiber is mounted, and on which the material is formed. In the approach disclosed herein, since the fiber is suspended in a thermally insulative environment (e.g., air or any other effective thermal insulator), and is in thermal contact with only material 160 (also thermally insulated except for its contact with source 170), the heat sink effect of surrounding structures is minimized, and faster and more predictable control of the temperature, and therefore the optical attenuating effects, are provided.

Figure 3:
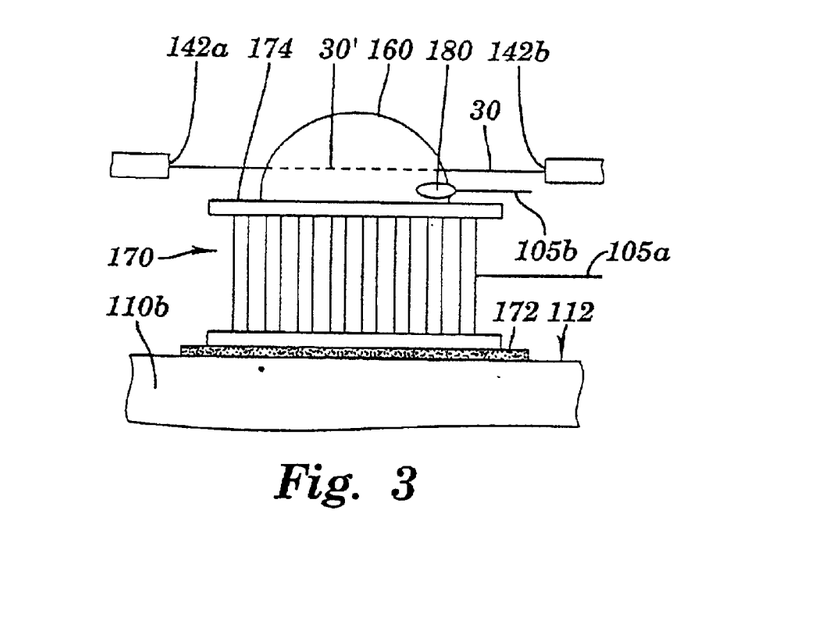
FIG. 3 is an enlarged view of certain features of the attenuator of FIGS. 1 and 2.
Figure 4:
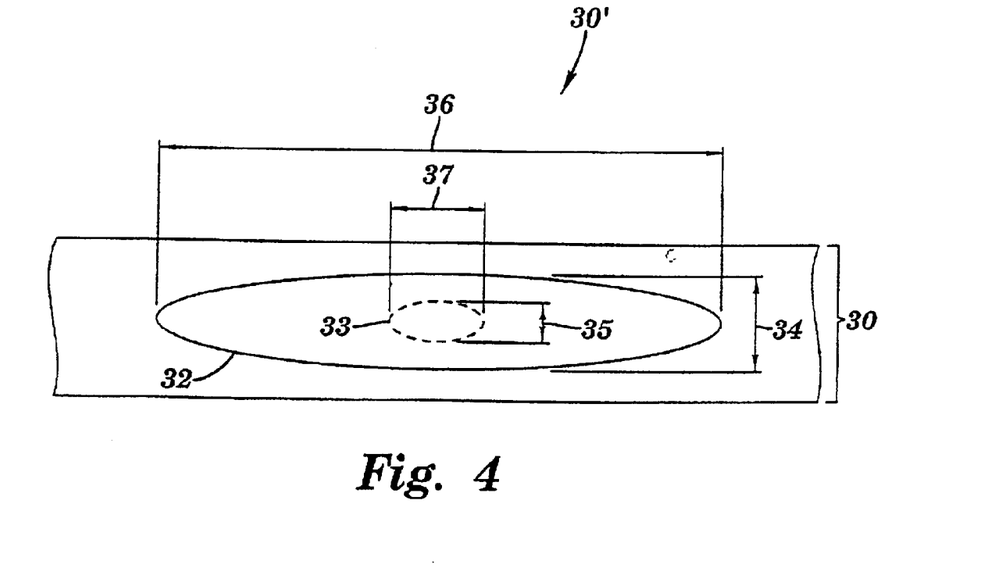
FIG. 4 is a top plan view of a side-polished fiber optic showing the exposed surface and an exemplary optical interaction area.

With reference to the enlarged view of FIG. 3, as discussed above, controllable heating/cooling source 170 is mounted to an inside housing wall 112, using epoxy 172, and projects toward fiber optic 30. Source 170 supports a controllable material 160 on its active control surface 174. As discussed herein, a portion 30' of fiber optic 30 has material removed therefrom thereby exposing the evanescent field of the optical energy transmitted therein such that at least some of the optical energy can be controllably extracted therefrom, using controllable material 160. With reference to FIG. 4, this portion 30' of fiber optic 30 is shown in greater detail. Fiber optic 30, for example, is polished into its cladding, approaching the core, thereby exposing a surface 32 having, in one example, a width 34 dimension of 100 μm, and a length 36 dimension of 7–10 mm. This substantially flat surface may be formed by polishing the cladding of the fiber optic in accordance with the techniques disclosed in the above-incorporated, pending U.S. patent application entitled "BLOCKLESS TECHNIQUES FOR SIMULTANEOUS POLISHING OF MULTIPLE FIBER OPTICS." Though the cladding is polished to this surface 32, the actual evanescent optical interaction area 33 is much smaller, i.e., having a width 35 of 10 μm and a length 37 of 2 mm. In general, this optical interaction area 33 must be substantially covered by the controllable material 160, but the material can actually extend beyond this optical interaction area 33 to encompass the entire polished surface 32.

Referring to FIGS. 1–4, one exemplary fabrication technique for the attenuator includes:

a) polishing a portion 30' of the fiber (FIGS. 3 and 4);

b) suspending the polished portion of the fiber between two support points 142a and 142b of a fiber support structure (e.g., 140, FIG. 2) and gluing the adjacent input and output portions of the fiber in respective, preformed, longitudinal notches running outward toward the distal ends of the support structure;

c) affixing the controllable heating/cooling source 170 to an inner wall 112 of an outer shell piece 110b of a housing using a thermally conductive epoxy 172;

d) forming the controllable material 160 on a control surface 172 of the controllable heating/cooling source 170 such that it retains some softness (at least temporarily); and e) bringing the fiber support structure 140 and the shell piece 110b into their assembled relationship wherein the suspended fiber portion 30' is immersed in the softened controllable material 160 such that at least the interaction area 33 thereof is covered by a portion of material 160.

As discussed above with reference to FIGS. 1–3, material 160 may be controlled using a controllable heating/cooling source 170. Further, a sensor 180 can be placed (FIG. 3) in material 160, to measure the resultant temperature thereof. The signal representing the temperature can be carried from the attenuator using sense leads 105b, and the controllable heating/cooling source can be operated using control leads 105a.

Figure 5A:
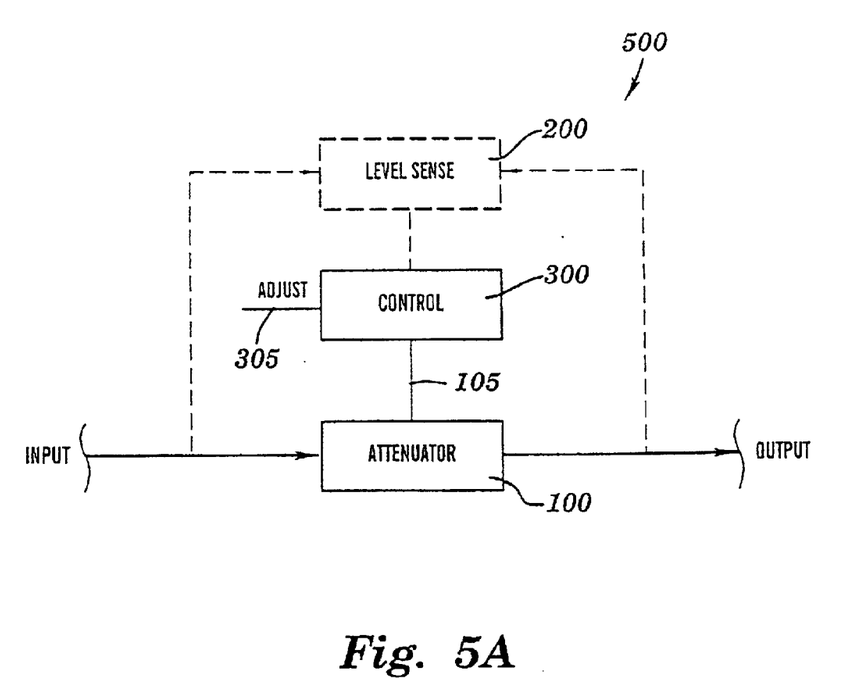
FIG. 5A is a block diagram of an exemplary attenuation system in accordance with the present invention.

An exemplary attenuation system 500 employing controllable attenuator 100 is shown in FIG. 5A. The attenuation system 500 includes a controllable attenuator 100, a control circuit 300, and an optional level-sense circuit 200. Control circuit 300 supplies control stimulus 105 to the controllable attenuator 100 to change the changeable stimulus (temperature or voltage) and therefore the refractive index of the controllable material thereof. Control circuit 300 receives as an optional input a desired level stimulus 305 from, for example, a user, and adjusts the control stimulus 105 as a function thereof. Control circuit 300 may also receive an optional sensed level stimulus from level sense circuit 200. This sensed level stimulus can be, for example, a ratio of measured levels of optical energy both prior to and following the attenuation thereof by the attenuator 100. By comparing this sensed level stimulus to the desired level stimulus, control circuit 300 can vary the value of control stimulus 105 until the input desired level stimulus and sensed level stimulus are matched.

Figure 5B:
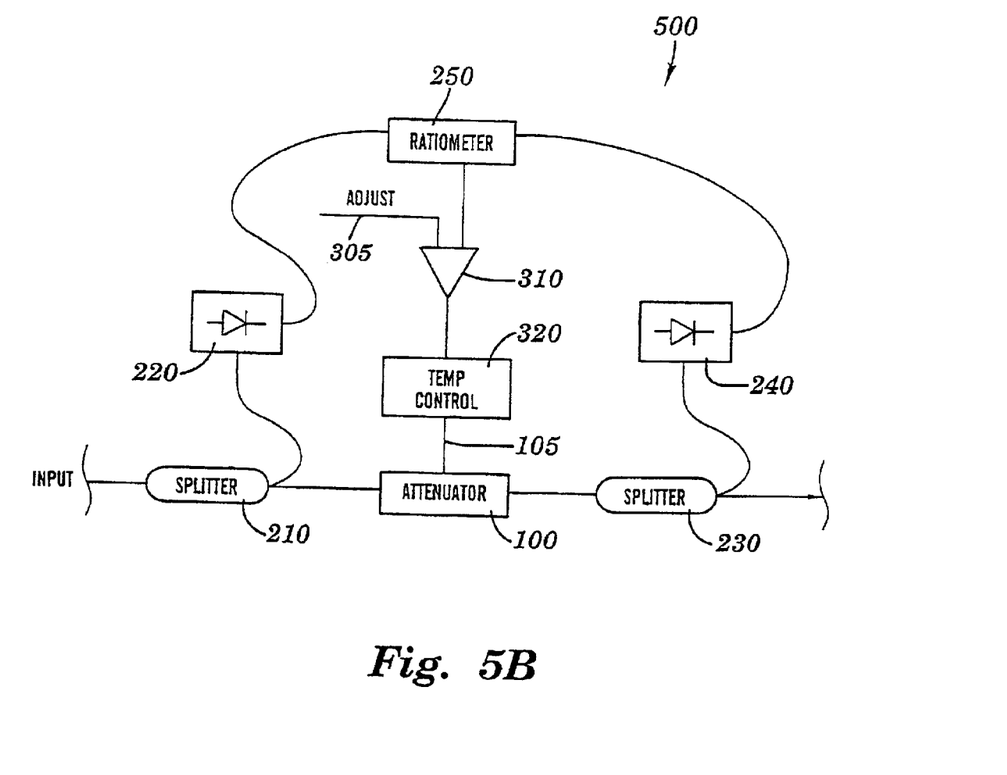
FIG. 5B is an exemplary schematic of the attenuation system of FIG. 5A.

Exemplary attenuation system 500 is depicted in an exemplary schematic form in FIG. 5B. The controllable attenuator 100 is preceded and followed by 1% fiber couplers (splitters 210, 230) which tap a small fraction of the optical power propagating in the fiber. The decoupled light is carried to characterized photodetectors (220, 240) and the generated photocurrents are analyzed by a ratiometer 250. Comparator circuit 310 receives the sensed level stimulus output of the ratiometer and/or a desired level stimulus 305 (from a user) and transmits a signal to the temperature controller 320. The temperature controller provides the control stimulus 105 to controllable attenuator 100 to change the changeable stimulus (temperature or voltage) and therefore the refractive index of the controllable material thereof. In this way, the optical attenuation level (photocurrent ratio) is directly compared to a calibrated attenuation adjustment signal 305 (user or system input) until they are matched. This feedback loop controls the attenuation effected by the controllable attenuator and therefore ensures accurate performance.

Figure 5C:
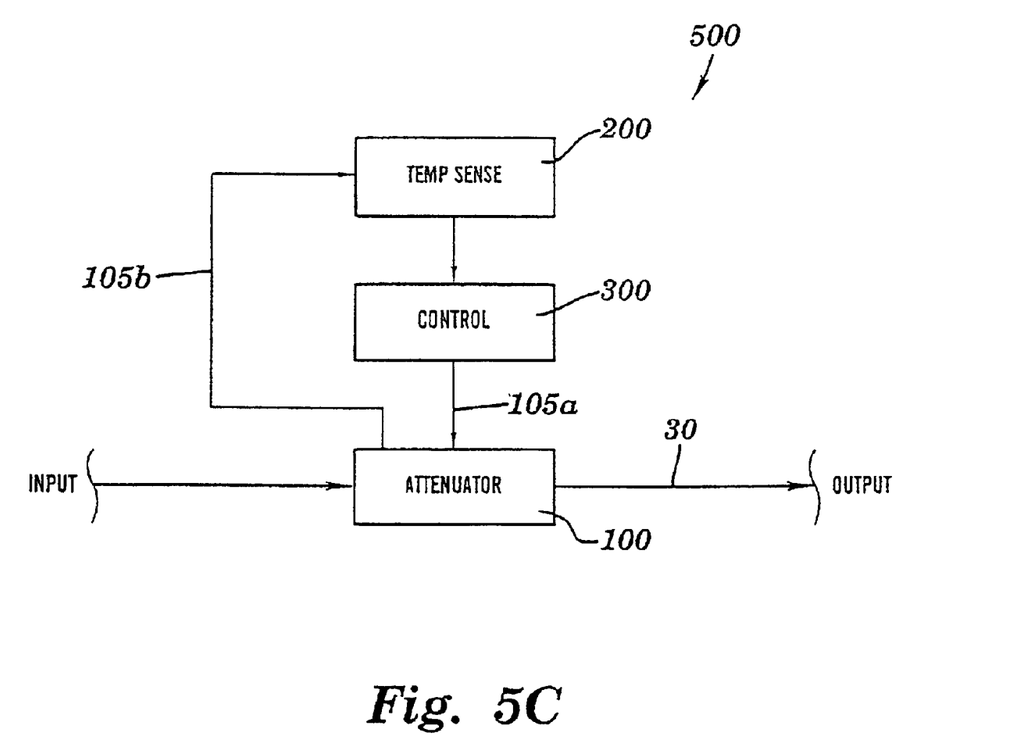
FIG. 5C is a further example of a system within which the attenuator of FIGS. 1–3 can be employed.

FIG. 5C depicts another exemplary system 500 employing attenuator 100, and its electrical control leads 105a and sense leads 105b. Sense leads 105b can be operated by a temperature sensing unit 200', which provides a result thereof to control circuit 300. (It should be noted that attenuator 100 normally requires calibration subsequent to its fabrication so that its optical response to changes in the temperature of the controllable material can be accurately predicted, and therefore used for accurate control, in an operational system, such as system 500.)

In one exemplary embodiment, the controllable heating/cooling source is a thermoelectric cooler (a heating and cooling source such as Melcor part number FC0.45-4-05); the thermal sensor is a thermistor (Fenwell Electronics part number 112-503JAJ-B01), and the fiber is a single mode fiber, (Corning part number SMF-28).

In another exemplary embodiment, attenuator 100 was made using a thermoresistive heater instead of the controllable heating/cooling source 170. In this example, a thin film chip resistor available from Vishay (www.vishay.com) was mounted on a platform. Attenuation of the optical energy was then controlled to, e.g. 30 dB of attenuation, using optical feedback control as in FIG. 5A. When the thermoresistive heater was turned on, the time to reduce the attenuation to 1 dB was about 140 milliseconds. By contrast, the response time for a device employing a thermoelectric cooler (otherwise identical) in the heating element required 500 milliseconds to go from 30 dB to 1 dB of attenuation. A thermoresistive heater could also be mounted on top of heating/cooling source 170, which would be held at a constant, relatively low temperature. In this embodiment, when the thermoresistive heater is turned off, the temperature of controllable material 160 decreases, and high attenuation (i.e >30 dB) at a fast rate can be achieved because the heat is dissipated much faster due to the low temperature of the heating/cooling source 170, i.e. heat sink. Likewise, a change from less attenuation to more attenuation would be quite fast in this embodiment.

Figure 8:
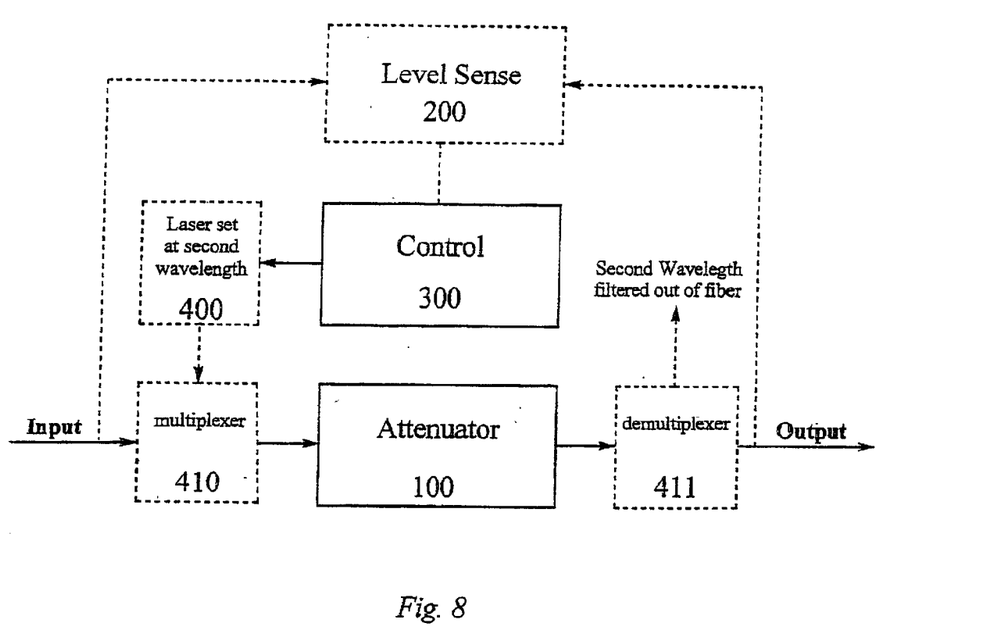
FIG. 8 is a block diagram of another exemplary attenuation system in accordance with the present invention.

In another exemplary embodiment, controllable material 160 may be controlled using a second wavelength of light 400 that is different from the first wavelength of light providing the optical signal of interest (FIG. 8). For example, light energy from a 980 nm light source 400 is coupled into the fiber using a 980/1550 multiplexer 410. (Thus, in this example, the first wavelength providing the optical energy of interest is 1550 nm, as one of skill would know). When the light energy from the 980 nm light source

400 reaches the polished region 32 of the fiber 30' at least some of controllable material 160 adjacent side surface 32 of fiber portion 30' (i.e. actual evanescent optical interaction area 33) absorbs the light and heats controllable material 160, thereby raising its temperature and causing a change in refractive index. The amount of optical signal extracted from the fiber can therefore be controlled by varying the intensity of the light energy from light source 400 (e.g. from the 980 nm signal) because changing the intensity of the light also changes or controls the temperature of at least a portion of controllable material 160 at critical point 33 of fiber portion 30'. Typically, the intensity of the light will be varied from approximately 0 to about 50 mW. The attenuated optical signal then continues through fiber 30 and the residual 980 nm light is extracted using, for example, demultiplexer output 411.

Improvement in the spectral uniformity of the device can be obtained through proper choice of the controllable material 160. More particularly, dispersion controlled polymers such as any of those disclosed in the above-incorporated, U.S. patents entitled "DISPERSION CONTROLLED POLYMERS FOR BROADBAND FIBER OPTIC DEVICES," or in U.S. patent application Ser. No. 09/628,887 entitled "DYE-APPENDED DISPERSION-CONTROLLED POLYMERS FOR BROADBAND FIBER OPTIC DEVICES" or in U.S. patent application Ser. No. 09/605,110 filed Jun. 28, 2000, entitled "SINGLE-CHANNEL ATTENUATORS", can be used as the controllable material 160 to improve spectral uniformity.

A mis-match between the dispersion characteristics of the material and the dispersion characteristics of the fiber may result in spectrally non-uniform attenuation across a band of interest (e.g., 1520–1580 nm). By controlling the dispersion of material 160, spectral uniformity can be improved. Preferably, the dispersion of material 160 should be controlled to be matched to that of the mode index of the fiber, thereby providing optimum spectral uniformity.

In particular, the dispersion-controlled polymer composition comprises a polymer and a dye. The polymer is typically a polar olefin polymer, which may, for example, comprise monomeric units derived from an acrylate or from two or more polar olefins. The dye may be mixed with the polymer or appended therefrom.

A suitable dye is, for example, (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate, or a metal complex dye having the general formula bis[1,2-[(4-alkyl$^1$ alkyl$^2$ amino)phenyl]-1,2-ethylenedithiolate]Met represented by structure (I)

(I)

Alkyl$^1$ and alkyl$^2$ are each independently lower alkyls containing 2 to 8 carbon atoms. In addition, alkyl$^1$ may differ from or may be the same as alkyl$^2$. Met is a Group IIIB metal, such as nickel, palladium or platinum. Exemplary metal complex dyes include bis[1,2-(4-dibutylaminophenyl)-1,2-ethylenedithiolate]nickel; bis[1,2-[4-(ethyl heptyl amino)phenyl]-1,2-ethylenedithiolate] nickel; bis[1,2-(4-dibutylaminophenyl)-1,2-ethylenedithiolate]platinum; or bis[1,2-[4-(ethyl heptyl amino)phenyl]-1,2-ethylenedithiolate]platinum.

The polar olefins, from which the monomeric units of the polymer are derived, are typically acrylates or may be selected from, but not limited to: tetrafluoropropyl acrylate, tetrafluoropropylmethacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride. As commonly used in the chemical art, the term "polar" refers to, e.g., the property in which the positive and negative electrical charges of the olefin monomers are permanently separated, and the term "olefin" refers to, e.g., the class of unsaturated aliphatic hydrocarbons having one or more double bonds. Polar olefin polymers, also referred to in the art as "polyolefins", are easily synthesized from a variety of commercially available polar olefin monomers using conventional polymerization reactions. As explained in detail in the aforementioned related patents and patent applications, polymers with added dyes or appended dyes provide the required dispersion control, and are also thermo-optically active.

Figure 6:
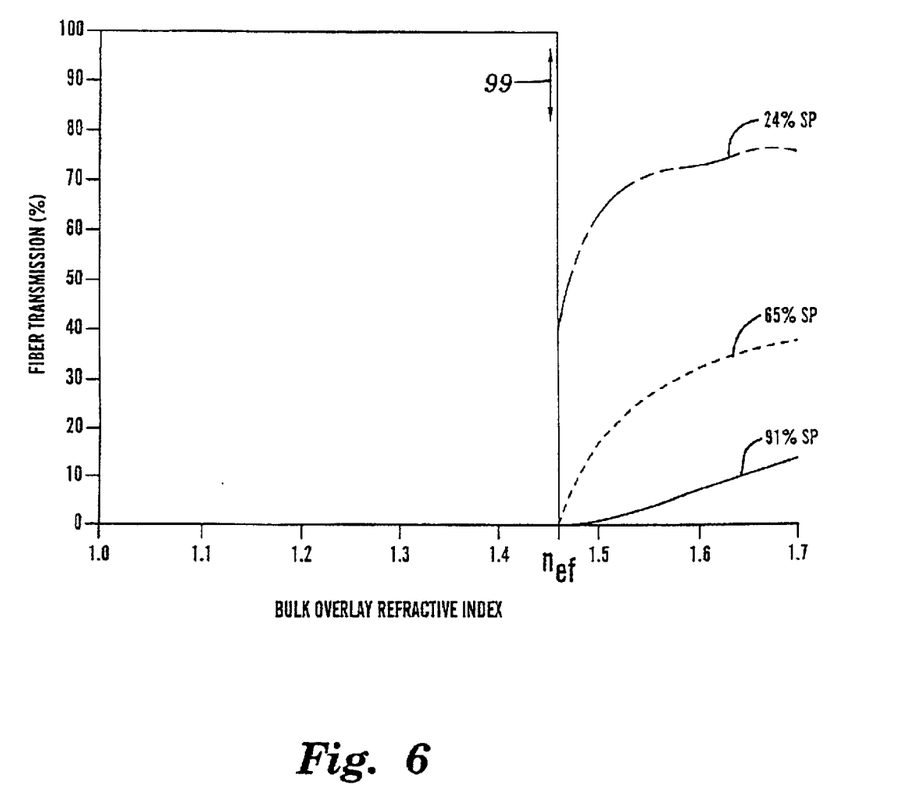
FIG. 6 is a graph depicting, in percentage, the loss characterization versus the refractive index of an overlay material for three exemplary levels of fiber side-polishing.

In U.S. Pat. No. 5,966,493 entitled "FIBER OPTIC ATTENUATORS AND ATTENUATION SYSTEMS", a cladding-driven approach was disclosed in which a thin, controllable cladding layer is placed between a high index bulk overlay and the surface of the fiber. The high index bulk material has an index significantly greater than the effective mode index of the fiber ($n_{ef}$). By using a higher overlay index, the spectrally non-uniform characteristics of the device were avoided, such as those along curve 99 depicted in FIG. 6 (reproduced from FIG. 2a of the previously filed application, and explained in greater detail therein). However, by using materials having their dispersion controlled relative to the dispersion of the fiber mode index, operation along curve 99, with the refractive index of the overlay approximating that of the fiber, is possible with spectral uniformity.

Figure 7A:
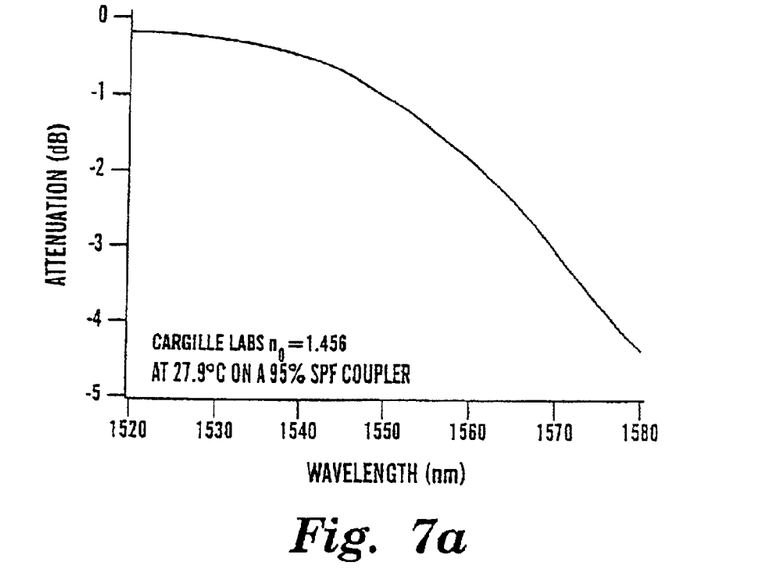
FIGS. 7a–b are spectral plots of the attenuation obtained using a standard overlay material, and a dispersion-matched overlay material, respectively.
Figure 7B:
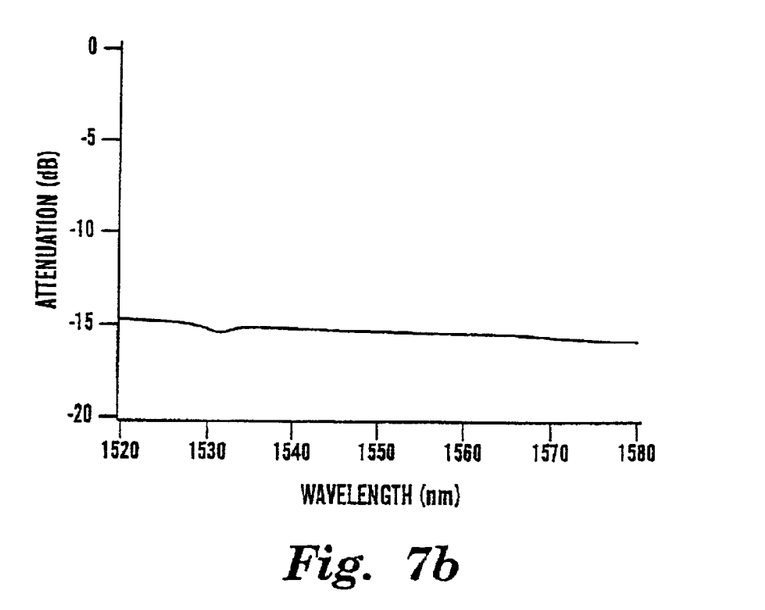

The spectral attenuation characteristics of a non-dispersion controlled material (Cargille oil, $n_D$=1.456 at 27° C. on a 95% polished fiber) are shown in FIG. 7a in the range of 1520–1580 nm. The spectral attenuation characteristics of the same device using an approximately dispersion matched polymer (40% DMMA, 60% TFPMA and 0.9 mole % Ni (ethyl, heptyl) dye at 19° C.) are shown in FIG. 7b. As is evident from a comparison of the spectra of 7a and 7b, using dispersion matched polymers greatly increases the spectral uniformity in a given wavelength band of interest. In this example, the attenuation level remains constant to within about 0.5 dB over this spectral range.

The disclosed "blockless" side-polished fiber approach, and the dispersion-matched thermo-optic materials, have permitted the development of the disclosed high performance, low cost broad-band compact variable attenuator. The blockless approach allows fiber components to be produced with minimal size, weight and thermal mass. This dramatically reduces device size and thermo-optic response time (to possibly about one second). Further, the incorporation of dispersion matched materials yields devices which have a spectrally uniform response, which is especially desirable for broadband applications.

In addition to these benefits, the blockless approach also retains the intrinsic performance characteristics of continuous fiber devices: low insertion loss, low back reflection (return loss), and low polarization-dependent loss ("PDL"). Exemplary performance levels of the disclosed attenuator are shown below in Table 1.

TABLE 1

| QUANTITY | VALUE | UNIT |
|---|---|---|
| Dynamic Range | 50 | dB |
| Spectral Variance (1500–1600 nm) | 0.5 | dB |
| Excess Loss | 0.05 | dB |
| PDL | 0.5 | dB |
| Return Loss | −55 | dB |
| Optical Power Handling | 20 | dBm |
| DC Power Consumption | <200 | mW |

In accordance with the present invention, it is also possible to develop more sophisticated designs such as ovenized and/or multiple thermo-electric cooling devices to improve device stability. Further, because of the design flexibility afforded by the dispersion-matched polymers (i.e., control of the refractive index), it is possible to design custom applications which exhibit minimal power consumption and varying operating temperatures.

In summary, the blockless, dispersion matched fiber optic attenuator of the present invention is a high performance design with wide flexibility. The simplicity of the design permits low-cost, high-volume manufacturing without sacrificing performance.

While the invention has been particularly shown and described with reference to preferred embodiment(s) thereof, it will be understood by those skilled in the art that various changes in form and details may be made therein without departing from the spirit and scope of the invention.

What is claimed is:

1. An attenuator for attenuating optical energy at a first wavelength, said attenuator comprising:

a portion of a fiber optic through which the optical energy at the first wavelength and through which light energy at a second wavelength are transmitted, the portion of the fiber optic having a side surface through which at least some of the optical energy at the first wavelength can be controllably extracted;

a controllable material formed over the side surface of the fiber optic, wherein the controllable material controllably extracts the optical energy at the first wavelength according to a changeable stimulus applied thereto; and a light source in operative contact with the controllable material for applying the changeable stimulus thereto;

wherein the changeable stimulus comprises the light energy at the second wavelength;

wherein the temperature of at least some of the controllable material residing adjacent the side surface of the fiber is raised as the light energy at the second wavelength is absorbed by the controllable material.

* * * * *